(12) United States Patent
Iwai et al.

(10) Patent No.: US 11,047,310 B2
(45) Date of Patent: Jun. 29, 2021

(54) GAS TURBINE COMBUSTOR INCLUDING LASER IGNITION

(71) Applicant: Toshiba Energy Systems & Solutions Corporation, Kawasaki (JP)

(72) Inventors: Yasunori Iwai, Yokohama (JP); Yasuaki Nakamura, Yokohama (JP); Masao Itoh, Yokohama (JP); Yuichi Morisawa, Yokohama (JP)

(73) Assignee: Toshiba Energy Systems & Solutions Corporation, Kawasaki (JP)

( * ) Notice: Subject to any disclaimer, the term of this patent is extended or adjusted under 35 U.S.C. 154(b) by 283 days.

(21) Appl. No.: 16/242,042

(22) Filed: Jan. 8, 2019

(65) Prior Publication Data
US 2019/0145319 A1    May 16, 2019

Related U.S. Application Data

(63) Continuation of application No. PCT/JP2016/003623, filed on Aug. 5, 2016.

(51) Int. Cl.
*F02C 7/264* (2006.01)
*F23R 3/00* (2006.01)
(Continued)

(52) U.S. Cl.
CPC .............. *F02C 7/264* (2013.01); *F02C 3/30* (2013.01); *F02C 3/34* (2013.01); *F23R 3/00* (2013.01);
(Continued)

(58) Field of Classification Search
CPC .... F23R 2900/00006; F23R 3/04; F23R 3/28; F23R 3/045; F23R 3/44;
(Continued)

(56) References Cited

U.S. PATENT DOCUMENTS

| | | | |
|---|---|---|---|
| 4,416,226 A | * | 11/1983 | Nishida .................. F02P 23/04 123/143 B |
| 5,367,869 A | * | 11/1994 | DeFreitas ............... F02C 7/264 60/39.821 |

(Continued)

FOREIGN PATENT DOCUMENTS

| | | |
|---|---|---|
| JP | 57-200672 | 12/1982 |
| JP | 2011-1952 | 1/2011 |

(Continued)

OTHER PUBLICATIONS

International Search Report dated Oct. 18, 2016 in PCT/JP2016/003623, filed on Aug. 5, 2016 (with English Translation).

(Continued)

*Primary Examiner* — William H Rodriguez
(74) *Attorney, Agent, or Firm* — Oblon, McClelland, Maier & Neustadt, L.L.P.

(57) ABSTRACT

A combustor according to an embodiment includes: a cylinder body that demarcates a space between a combustor casing and a combustor liner; a pipe that guides a combustion gas between the combustor liner and the cylinder body; a pipe that guides a combustion gas having a temperature lower than a combustion gas to be guided to the pipe between the combustor casing and the cylinder body; a pipe-shaped member provided so as to penetrate the combustor casing, the cylinder body, and the combustor liner; a heat-resistant glass that is provided in the pipe-shaped member; a condensing lens provided in a manner to face the heat-resistant glass; and a laser oscillator that emits laser light to the inside of the combustor liner through the condensing lens.

8 Claims, 6 Drawing Sheets

(51) Int. Cl.
    F02C 3/34      (2006.01)
    F02C 3/30      (2006.01)
    F23R 3/04      (2006.01)
    F23R 3/28      (2006.01)
    F23R 3/44      (2006.01)
(52) U.S. Cl.
    CPC ............... *F23R 3/04* (2013.01); *F23R 3/045*
        (2013.01); *F23R 3/28* (2013.01); *F23R 3/44*
        (2013.01); *F23R 2900/00006* (2013.01); *F23R
        2900/03043* (2013.01)
(58) Field of Classification Search
    CPC .. F23R 2900/03043; F02C 7/264; F02C 3/34;
        F02C 3/04; F02C 3/30; F02C 1/08; F02P
        23/04; F05D 2260/99; F23Q 13/005
    See application file for complete search history.

(56)            References Cited

U.S. PATENT DOCUMENTS 5,459,574  A  * 10/1995  Lee ..................... G01N 21/39
                                                        356/437
    5,845,480  A  * 12/1998  DeFreitas ............... F02C 7/264
                                                         60/776
    7,843,633  B2 * 11/2010  Nakamae ............. B23K 26/066
                                                       219/121.6
    8,773,653  B2 *  7/2014  Shirakura ............. G01B 11/272
                                                        356/138
   10,193,305  B2 *  1/2019  Kawakita ................ H01S 5/142
  2007/0068475  A1 *  3/2007  Kopecek .............. F02P 23/04
                                                        123/143 B
  2009/0044776  A1 *  2/2009  Klausner .............. F02C 7/264
                                                        123/143 B 2010/0319643  A1 * 12/2010  Kopecek .............. F02C 7/264
                                                        123/143 B
  2012/0131926  A1 *  5/2012  Kopecek .............. F02C 7/264
                                                         60/776
  2012/0131927  A1 *  5/2012  Denis ................. F02C 7/24
                                                         60/776
  2014/0237989  A1 *  8/2014  Davenport ............. F02P 23/04
                                                        60/39.821
  2014/0238038  A1 *  8/2014  Macchia ............... F02C 7/264
                                                         60/778
  2016/0094006  A1 *  3/2016  Hagita ................ H01S 3/005
                                                        123/143 B
  2016/0094009  A1 *  3/2016  Izumiya ............... H01S 3/1611
                                                        123/143 B
  2016/0276809  A1 *  9/2016  Okura ................. F02P 23/04
  2017/0107966  A1    4/2017  Kanehara et al.
  2017/0179667  A1 *  6/2017  Okura ................. H01S 3/09415
  2017/0241395  A1 *  8/2017  Hwang ................. F02B 5/02
  2018/0226764  A1 *  8/2018  Hagita ................ H01S 3/034
  2018/0269656  A1 *  9/2018  Hagita ................ F02P 23/04
  2018/0347537  A1 * 12/2018  Ikeoh ................. H01S 3/0941
  2018/0375278  A1 * 12/2018  Brunne ................ H05G 2/008
  2019/0186369  A1 *  6/2019  Lowery ................ H01Q 13/08
  2019/0186372  A1 *  6/2019  Lowery ................ F23R 3/34

FOREIGN PATENT DOCUMENTS

JP          2012-117535        6/2012
    JP          2015-167211        9/2015
    JP          2016-8590          1/2016

OTHER PUBLICATIONS

Written Opinion dated Oct. 18, 2016 in PCT/JP2016/003623, filed on Aug. 5, 2016.

* cited by examiner

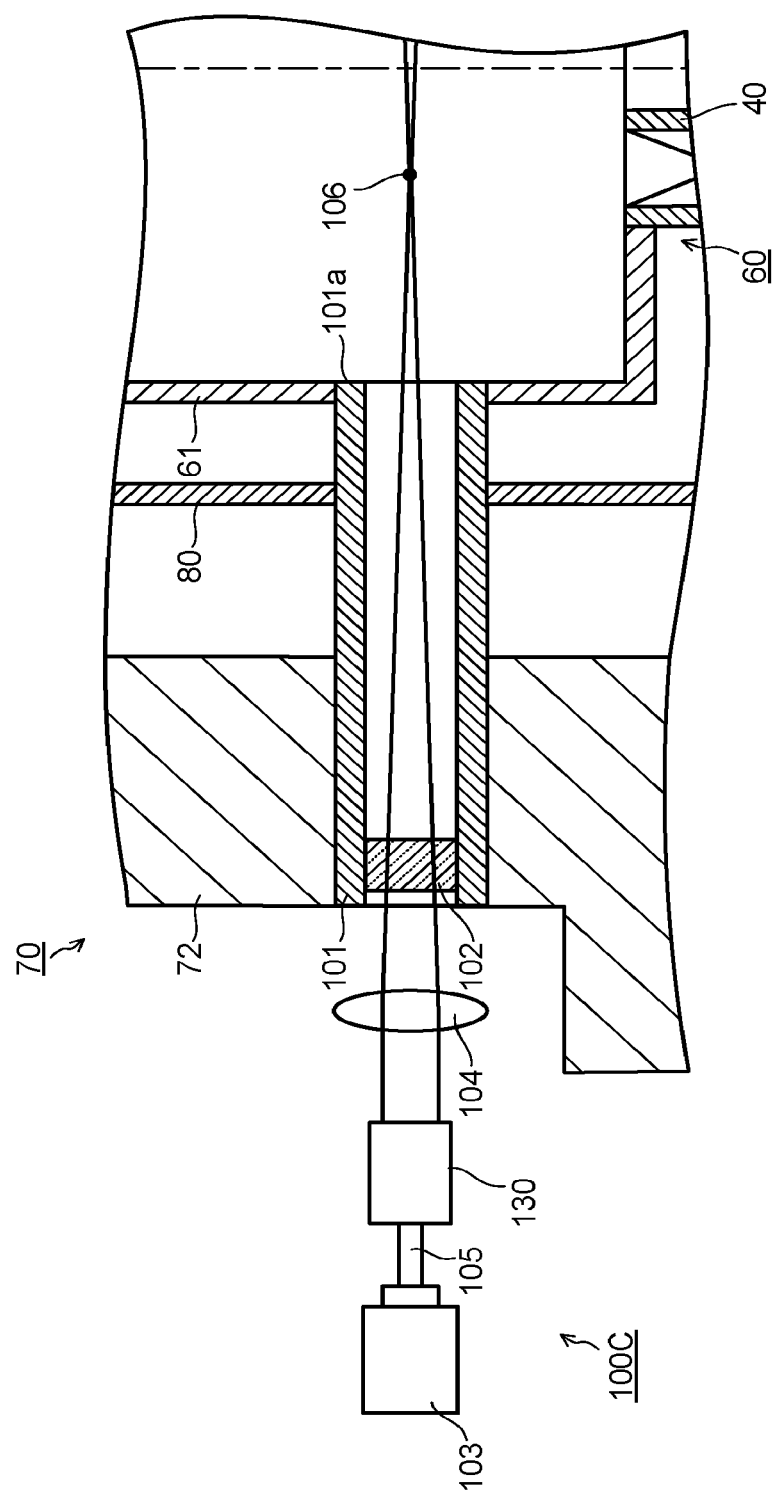

GAS TURBINE COMBUSTOR INCLUDING LASER IGNITION

CROSS-REFERENCE TO RELATED APPLICATIONS

This application is a continuation of prior International Application No. PCT/JP2016/003623 filed on Aug. 5, 2016; the entire contents of all of which are incorporated herein by reference.

FIELD

Embodiments described herein generally relate to a gas turbine combustor.

BACKGROUND

Increasing the efficiency of power generation plants is in progress in response to demands for reduction of carbon dioxide, resource conservation, and the like. Concretely, increasing the temperature of a working fluid of a gas turbine, employing a combined cycle, and the like are actively in progress. Further, research and development of collection techniques of carbon dioxide are in progress.

Under such circumstances, a gas turbine facility including a combustor that combusts a fuel and oxygen in a supercritical $CO_2$ atmosphere is under consideration. In this gas turbine facility, a part of a combustion gas produced in the combustor is circulated in a system as a working fluid.

In the combustor of the gas turbine facility using this supercritical $CO_2$ (to be referred to as a $CO_2$ gas turbine facility, hereinafter), a mixture resulting from the fuel and an oxidizer mixed in the combustor is ignited by using an ignition device. At the time of ignition, the oxidizer flow rate and the fuel flow rate are reduced in order to suppress a sudden heat load on the combustor. Then, after the ignition, the circulating working fluid and the oxidizer flow rate are increased to increase the pressure in the combustor, and at the same time, the fuel flow rate is increased to increase the combustion gas temperature in the combustor. As above, for example, the pressure and the combustion gas temperature in the combustor are increased up to a rated load condition of the turbine.

Conventionally, as the ignition device in the combustor of the gas turbine, a spark ignition device and a laser ignition device have been used. In the spark ignition device, a spark plug causes spark discharge to ignite a mixture. In the spark ignition device, for example, a plug unit being a spark discharge unit is disposed in the combustor so as to project inside the combustor. In this case, the plug unit is exposed to flames. Further, from the viewpoint of durability of the spark ignition device or the like, a spark ignition device formed to pull the plug unit out of the combustor after ignition is also under consideration.

The laser ignition device irradiates a mixture inside the combustor with a laser to cause ignition. For example, laser light emitted by a laser oscillator is irradiated in a combustor liner through a lens, a pressure-resistant glass window of a casing part, and a laser passage pipe coupling the casing and the combustor liner. Then, the laser light is focused in the combustor liner. By the laser light being focused, an energy density increases and gas in this portion is plasmatized (breaks down) to ignite the mixture.

In the case of the previously described $CO_2$ gas turbine facility, the pressure inside the combustor under a turbine rated load becomes equal to or more than 10 times larger than that inside a combustor in the conventional gas turbine. Further, in the case of the $CO_2$ gas turbine facility, the temperature of supercritical $CO_2$ to circulate in the combustor under a turbine rated load becomes a temperature of 600° C. or more that is greater than the temperature of air to be introduced into the combustor in the conventional gas turbine (about 400° C.).

These high-temperature and high-pressure conditions greatly surpass the pressure-resistant specifications and heat-resistant specifications of the ignition device in the combustor of the conventional gas turbine. Therefore, it is impossible to apply the specifications of the conventional ignition device to the combustor of the $CO_2$ gas turbine facility without any changes or modifications.

BRIEF DESCRIPTION OF THE DRAWINGS

FIG. 6 is an enlarged view schematically illustrating a longitudinal section of an ignition device in a combustor according to a third embodiment.

DETAILED DESCRIPTION

Hereinafter, there will be explained embodiments according to the present invention with reference to the drawings.

A gas turbine combustor of one embodiment includes: a casing; a flame tube provided in the casing to combust a fuel and an oxidizer; a cylinder body demarcating a space between the casing and the flame tube; a first combustion gas supply pipe that guides a combustion gas between the flame tube and the cylinder body, the combustion gas exhausted from the flame tube and having driven a turbine; and a second combustion gas supply pipe that guides a combustion gas having a temperature lower than a combustion gas to be guided to the first combustion gas supply pipe between the casing and the cylinder body, the combustion gas exhausted from the flame tube and having driven the turbine.

A gas turbine combustor further includes: a pipe-shaped member provided so as to penetrate the casing, the cylinder body, and the flame tube; a heat-resistant glass that is provided in the pipe-shaped member on the casing side and seals the pipe-shaped member; a condensing lens provided outside the casing in a manner to face the heat-resistant glass; and a laser oscillator that emits laser light to the inside of the flame tube through the condensing lens, the heat-resistant glass, and the inside of the pipe-shaped member.

First Embodiment

Figure 1:
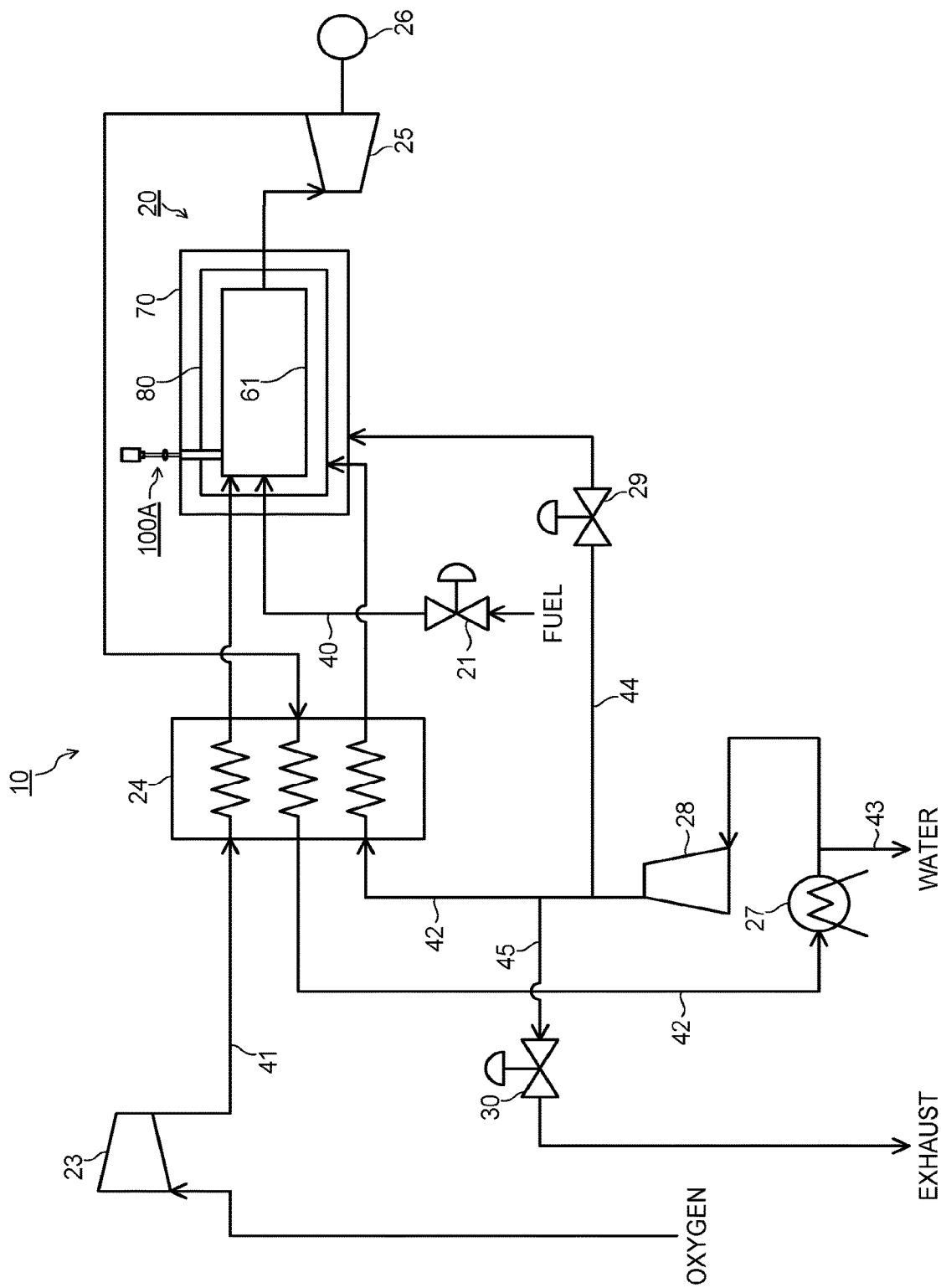
FIG. 1 is a system diagram of a gas turbine facility including a combustor according to a first embodiment.

FIG. 1 is a system diagram of a gas turbine facility 10 including a combustor 20 according to a first embodiment. As illustrated in FIG. 1, the gas turbine facility 10 includes the combustor 20 that combusts a fuel and an oxidizer, a pipe 40 that supplies the fuel to the combustor 20, and a pipe 41 that supplies the oxidizer to the combustor 20. Further, the combustor 20 includes an ignition device 100A that ignites a mixture of the fuel and the oxidizer in the combustor 20. The combustor 20 functions as a gas turbine combustor.

The pipe 40 includes therein a flow rate regulating valve 21 that regulates the flow rate of the fuel to be supplied into a combustor liner 61 of the combustor 20. Here, as the fuel, for example, hydrocarbon such as methane or natural gas is used. Further, as the fuel, for example, a coal gasification gas fuel containing carbon monoxide, hydrogen, and the like can also be used. The combustor liner 61 functions as a flame tube.

A compressor 23 that pressurizes the oxidizer is provided in the pipe 41. As the oxidizer, oxygen separated from the atmosphere by an air separating apparatus (not illustrated) is used. The oxidizer flowing through the pipe 41 is heated by passing through a heat exchanger 24 to be supplied to the combustor 20.

The fuel and the oxidizer guided to the combustor liner 61 undergo reaction (combustion) in a combustion region inside the combustor liner 61 and are turned into a combustion gas. Here, in the gas turbine facility 10, it is preferred that surplus parts of the oxidizer (oxygen) and the fuel should not remain in the combustion gas that is to be exhausted from the combustor liner 61. Thus, the flow rates of the fuel and the oxidizer are regulated so as to have a stoichiometric mixture ratio (equivalence ratio 1), for example. The equivalence ratio mentioned here is an equivalence ratio when it is assumed that the fuel and the oxygen are uniformly mixed (overall equivalence ratio).

The gas turbine facility 10 includes a turbine 25 that is rotated by the combustion gas exhausted from the combustor liner 61. For example, a generator 26 is coupled to this turbine 25. The combustion gas exhausted from the combustor liner 61, which is mentioned here, is one containing a combustion product produced from the fuel and the oxidizer and later-described carbon dioxide (a combustion gas from which water vapor has been removed) that is supplied into the combustor liner 61.

The combustion gas discharged from the turbine 25 is guided to a pipe 42 and cooled by passing through the heat exchanger 24. At this time, the oxidizer flowing through the pipe 41 and carbon dioxide flowing through the pipe 42 are heated by heat release from the combustion gas.

The combustion gas having passed through the heat exchanger 24 passes through a cooler 27. The combustion gas is got rid of the water vapor contained in the combustion gas by passing through the cooler 27. At this time, the water vapor in the combustion gas condenses into water. This water is discharged to the outside through a pipe 43, for example.

Here, as described previously, when the flow rates of the fuel and the oxidizer are regulated so as to have the stoichiometric mixture ratio (equivalence ratio 1), most of components of the combustion gas from which the water vapor has been removed (dry combustion gas) are carbon dioxide. A slight amount of, for example, carbon monoxide, or the like is sometimes mixed in the combustion gas from which the water vapor has been removed, but hereinafter, the combustion gas from which the water vapor has been removed is simply referred to as carbon dioxide.

The carbon dioxide is pressurized by a compressor 28 interposed in the pipe 42 to become a supercritical fluid. A part of the pressurized carbon dioxide flows through the pipe 42 and is heated in the heat exchanger 24. Then, the carbon dioxide is guided between the combustor liner 61 and a cylinder body 80. The temperature of the carbon dioxide having passed through the heat exchanger 24 becomes about 700° C. The pipe 42 functions as a first combustion gas supply pipe.

Another part of the pressurized carbon dioxide is introduced into a pipe 44 branching off from the pipe 42. The carbon dioxide introduced into the pipe 44 has its flow rate regulated by a flow rate regulating valve 29, and as a cooling medium, is guided between a combustor casing 70 and the cylinder body 80. The temperature of the carbon dioxide guided between the combustor casing 70 and the cylinder body 80 by the pipe 44 is about 400° C. The temperature of the carbon dioxide to be guided between the combustor casing 70 and the cylinder body 80 is lower than the temperature of the carbon dioxide to be guided between the previously described combustor liner 61 and the cylinder body 80.

The pipe 44 functions as a second combustion gas supply pipe, and the combustor casing 70 functions as a casing.

Meanwhile, the remaining part of the pressurized carbon dioxide is introduced into a pipe 45 branching off from the pipe 42. The carbon dioxide introduced into the pipe 45 has its flow rate regulated by a flow rate regulating valve 30 and is exhausted to the outside. The pipe 45 functions as an exhaust pipe. The carbon dioxide exhausted to the outside can be utilized for EOR (Enhanced Oil Recovery) or the like employed at an oil drilling field, for example.

Next, there will be explained a composition of the combustor 20 according to the first embodiment in detail.

Figure 2:
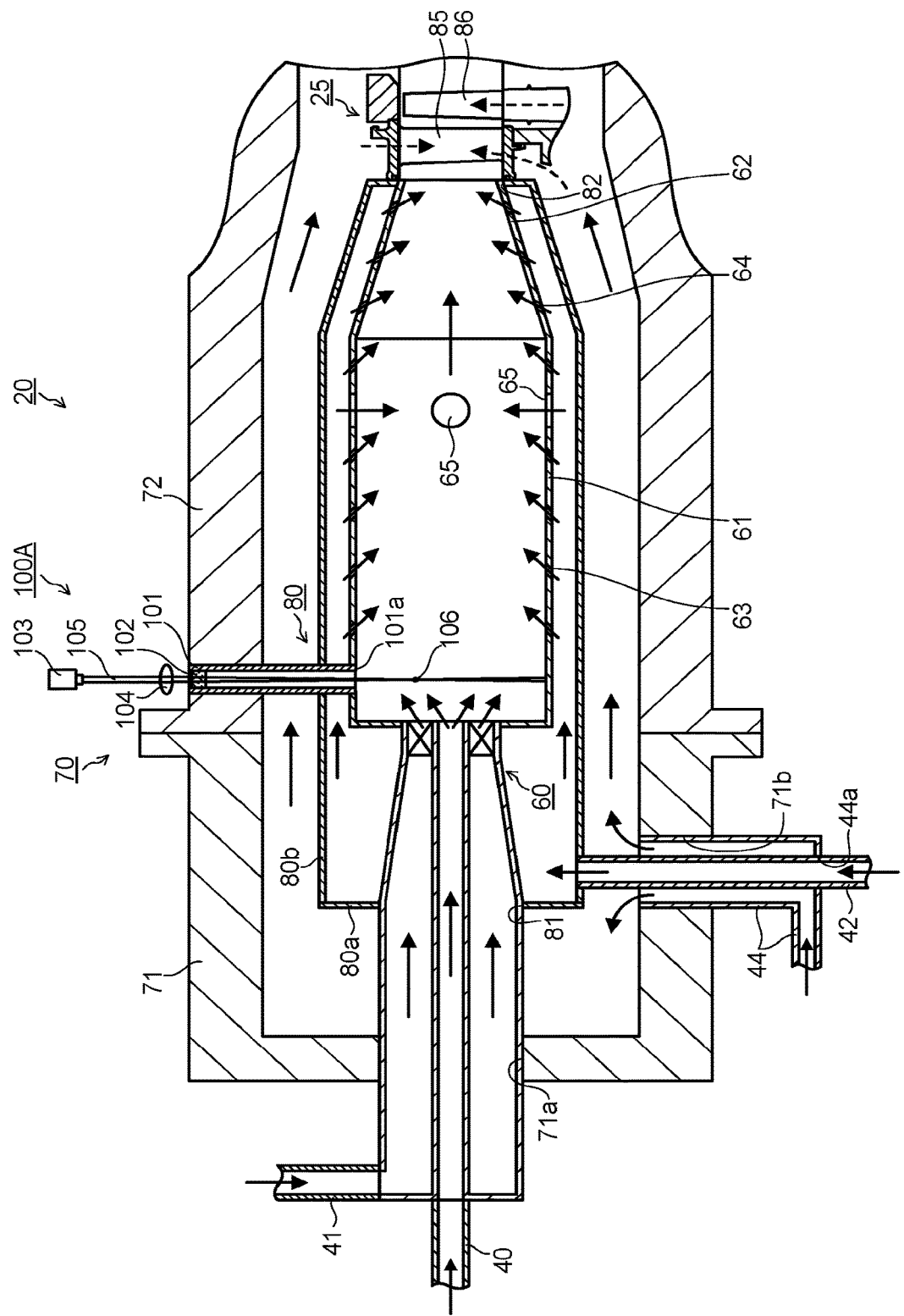
FIG. 2 is a view schematically illustrating a longitudinal section of the combustor according to the first embodiment.
Figure 3:
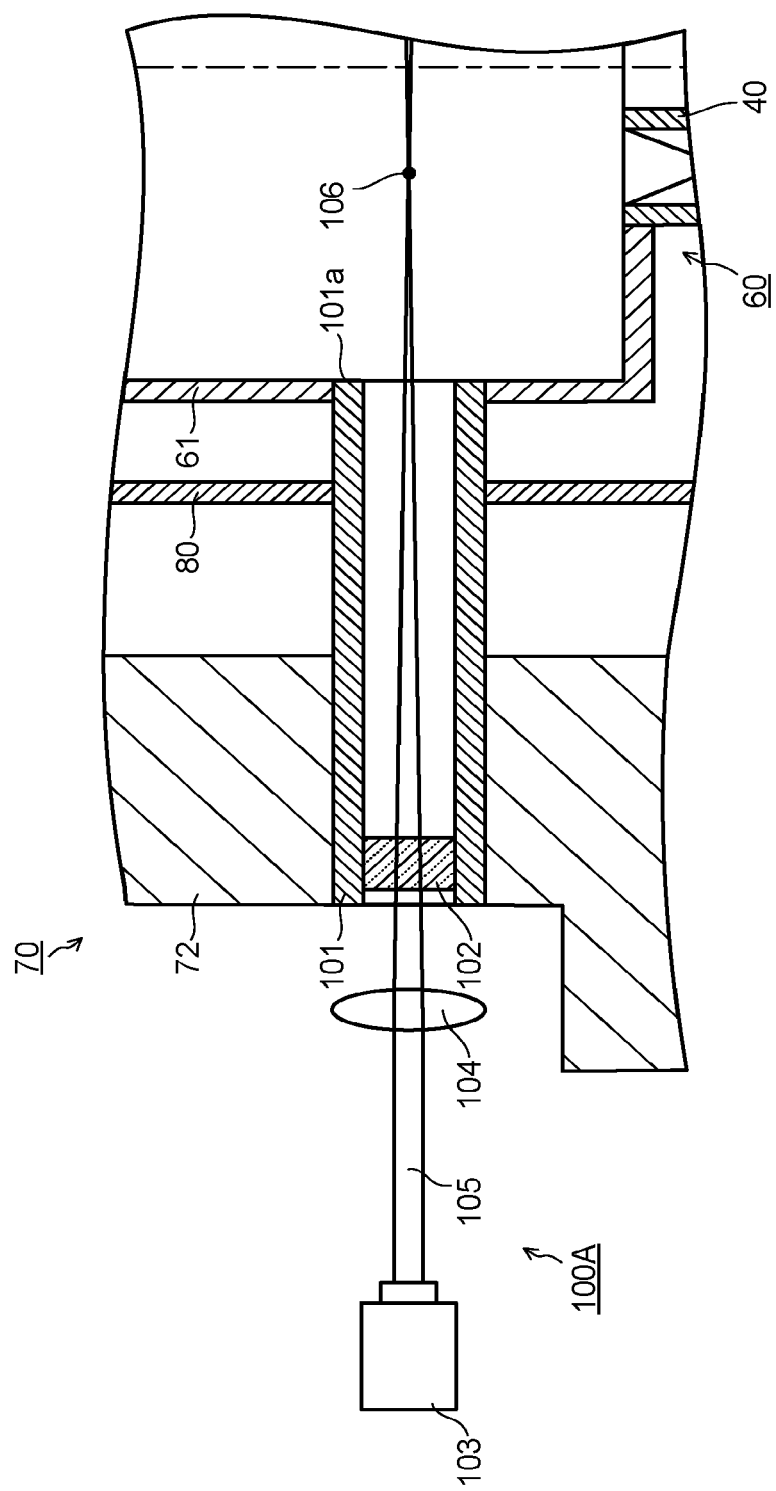
FIG. 3 is an enlarged view schematically illustrating a longitudinal section of an ignition device in the combustor according to the first embodiment.

FIG. 2 is a view schematically illustrating a longitudinal section of the combustor 20 according to the first embodiment. FIG. 3 is an enlarged view schematically illustrating a longitudinal section of the ignition device 100A in the combustor 20 according to the first embodiment.

As illustrated in FIG. 2, the combustor 20 includes a fuel nozzle part 60, the combustor liner 61, a transition piece 62 (tail pipe), the combustor casing 70, the cylinder body 80, and the ignition device 100A.

The fuel nozzle part 60 jets the fuel supplied from the pipe 40 and the oxidizer supplied from the pipe 41 into the combustor liner 61. For example, the fuel is jetted from the center and the oxidizer is jetted from the periphery of the center.

The combustor casing 70 is provided along a longitudinal direction of the combustor 20 so as to surround a part of the fuel nozzle part 60, the combustor liner 61, and the transition piece 62, for example. The combustor casing 70 is divided into two parts in the longitudinal direction of the combustor 20, for example. The combustor casing 70 is composed of an upstream-side casing 71 on an upstream side and a downstream-side casing 72 on a downstream side, for example.

The upstream-side casing 71 is formed of a cylinder body having one end (upstream end) thereof closed and the other end (downstream end) thereof opened, for example. In the center of the one end, an opening 71a into which the fuel nozzle part 60 is inserted is formed. Further, the pipe 44 is coupled to a side portion of the upstream-side casing 71. The pipe 44 is fitted in an opening 71b formed in the side portion of the upstream-side casing 71 to be joined, for example.

The downstream-side casing 72 is formed of a cylinder body having both ends thereof opened. One end of the downstream-side casing 72 is connected to the upstream-side casing 71, and the other end of the downstream-side casing 72 is connected to, for example, a casing surrounding the turbine 25.

As illustrated in FIG. 2, inside the combustor casing 70, the cylinder body 80 that surrounds peripheries of a part of the fuel nozzle part 60, the combustor liner 61, and the transition piece 62 and demarcates a space between the combustor casing 70 and the combustor liner 61 is provided. A predetermined space exists between the combustor liner 61 and the cylinder body 80.

The cylinder body 80 has one end (upstream end) thereof closed, in which an opening 81 into which the fuel nozzle part 60 is inserted is formed. The cylinder body 80 has the other end (downstream end) thereof closed, in which an opening 82 through which a downstream end of the transition piece 62 penetrates is formed. The cylinder body 80 is formed by joining a plate-shaped lid member 80a having the opening 81 therein to a cylindrical main body member 80b, for example.

The formation of the cylinder body 80 is not limited as long as the cylinder body 80 has a structure that surrounds peripheries of a part of the fuel nozzle part 60, the combustor liner 61, and the transition piece 62 as illustrated in FIG. 2.

An inner peripheral surface of the downstream-side opening 82 in the cylinder body 80 is in contact with an outer peripheral surface of the downstream end portion of the transition piece 62.

Further, the pipe 42 is coupled to an upstream-side side portion of the cylinder body 80. This pipe 42 is, as illustrated in FIG. 2, coupled to the side portion of the cylinder body 80 by passing through the inside of the pipe 44 coupled to the side portion of the upstream-side casing 71. The pipe 44 has a double-pipe structure in a portion through which the pipe 42 passes.

The pipe 42 is inserted into the inside of the pipe 44 through an opening 44a formed in the pipe 44, for example. Then, the pipe 42 is joined to the pipe 44 in an opening portion having the opening 44a, for example. Further, the double-pipe structure of the pipe 42 and the pipe 44 is not limited to being provided at one place and may be plurally provided in a circumferential direction.

The ignition device 100A includes a pipe-shaped member 101, a heat-resistant glass 102, a laser oscillator 103, and a condensing lens 104 as illustrated in FIG. 2 and FIG. 3.

The pipe-shaped member 101 is formed of a cylindrical pipe having both ends thereof opened, and/or the like. The pipe-shaped member 101 is provided to penetrate the combustor casing 70, the cylinder body 80, and the combustor liner 61. In other words, the pipe-shaped member 101 is disposed so as to penetrate through a coaxial circular communication hole formed in the combustor casing 70, cylinder body 80, and the combustor liner 61 from the direction vertical to the longitudinal direction of the combustor 20.

An inner end portion 101a of the pipe-shaped member 101 is formed so as not to project into the inside of the combustor liner 61. Further, an inside diameter of the pipe-shaped member 101 is set so as not to hinder laser light from passing through the inside of the pipe-shaped member 101.

The heat-resistant glass 102 is provided in the pipe-shaped member 101 on the outer side (combustor casing 70 side). Concretely, the heat-resistant glass 102 is preferably provided at a position, in the pipe-shaped member 101, to be the outer side relative to a flow path between the combustor casing 70 and the cylinder body 80, where the carbon dioxide flows.

The heat-resistant glass 102 is provided so as to seal the inside of the pipe-shaped member 101. This blocks communication between the inside and the outside of the combustor 20.

The condensing lens 104 is provided outside the combustor casing 70 (downstream-side casing 72) to face the heat-resistant glass 102. That is, the condensing lens 104 is provided between the laser oscillator 103 and the heat-resistant glass 102. A focal length and an installation position of the condensing lens 104 are set so as to have a focal point 106 at a position suitable for igniting the fuel-air mixture.

The laser oscillator 103 is disposed outside the combustor casing 70. The laser oscillator 103 emits laser light 105 to the inside of the combustor liner 61 through the condensing lens 104, the heat-resistant glass 102, and the inside of the pipe-shaped member 101. That is, the laser oscillator 103 is disposed so as to be able to emit the laser light 105 to the inside of the combustor liner 61 by passing through the condensing lens 104, the heat-resistant glass 102, and the inside of the pipe-shaped member 101 in this order.

The laser light 105 oscillated by the laser oscillator 103 may be emitted to the condensing lens 104 through an optical fiber.

Next, there will be explained an operation of the combustor 20.

At the time of ignition, the laser oscillator 103 is driven to oscillate the laser light 105. The laser light 105 oscillated by the laser oscillator 103 passes through the condensing lens 104 and the heat-resistant glass 102 to enter the pipe-shaped member 101. The laser light 105 that has passed through the pipe-shaped member 101 is focused on the focal point 106 in a predetermined region in the combustor liner 61. The laser light 105 travels in a traveling direction from the focal point 106 while expanding a beam diameter.

After emission of the laser light 105 to the inside of the combustor liner 61, the fuel and the oxygen are jetted into the combustor liner 61 from the fuel nozzle part 60. At this time, the fuel and the oxygen are jetted from the fuel nozzle part 60 in a state of the oxidizer flow rate and the fuel flow rate being reduced in order to suppress a sudden heat load on the combustor 20.

The oxidizer and the fuel jetted from the fuel nozzle part 60 flow while mixing together to create the mixture. Then, when the mixture flows to a high energy density position where the laser light is focused on the focal point 106, the mixture is ignited. This initiates combustion. Drive of the ignition device 100A is stopped when the combustion in the combustor liner 61 is stabilized, for example.

Then, after the ignition, the flow rate of the circulating carbon dioxide and the oxidizer flow rate are increased to increase the pressure inside the combustor, and at the same time, the fuel flow rate is increased to increase the combustion gas temperature inside the combustor. Then, the fuel flow rate, the flow rate of the circulating carbon dioxide, and the oxidizer flow rate are increased up to a rated load condition of the turbine.

Since the action of the combustion gas exhausted from the combustor liner 61 has been already explained with reference to FIG. 1, flows of the carbon dioxide introduced from the pipe 42 and the pipe 44 will be explained here.

The carbon dioxide introduced into the cylinder body 80 from the pipe 42 flows through an annular space between the combustor liner 61 and the cylinder body 80 to the downstream side. At this time, the carbon dioxide cools the combustor liner 61 and the transition piece 62.

Then, the carbon dioxide is introduced into the combustor liner 61 and the transition piece 63 through, for example, holes 63, 64 of a porous film cooling part, dilution holes 65, and the like in the combustor liner 61 and the transition piece 62.

In this manner, for example, the whole amount of the carbon dioxide introduced from the pipe 42 is introduced into the combustor liner 61 and the transition piece 62. The carbon dioxide introduced into the combustor liner 61 and the transition piece 62 is introduced into the turbine 25 together with the combustion gas produced by combustion.

Here, the temperature of the carbon dioxide introduced from the pipe 42 is about 700° C. This temperature of the carbon dioxide is lower compared to a temperature of the combustion gas to which the combustor liner 61 and the transition piece 62 are exposed. Therefore, the combustor liner 61 and the transition piece 62 are sufficiently cooled by this carbon dioxide. Further, since the temperature of the carbon dioxide is about 700° C., a combustion state is not impaired by the carbon dioxide introduced into the combustor liner 61.

In this manner, the carbon dioxide introduced from the pipe 42 is introduced into the turbine 25 without flowing out to the combustor casing 70 side from the cylinder body 80.

On the other hand, the low-temperature carbon dioxide flowing through the pipe 44 is guided to a double pipe composed of the pipe 42 and the pipe 44. The carbon dioxide guided to the double pipe passes through the pipe 44 to be guided between the combustor casing 70 and the cylinder body 80. Concretely, the carbon dioxide guided to the double pipe passes through an annular passage between the pipe 42 and the pipe 44 to be guided between the combustor casing 70 and the cylinder body 80.

The carbon dioxide flowing through between the pipe 42 and the pipe 44 cools a joint portion between the pipe 42 and the pipe 44 and the pipe 42 penetrating through the pipe 44. Further, the low-temperature carbon dioxide flows around the periphery of the pipe 42, to thereby suppress heat transfer from the pipe 42 through which the high-temperature carbon dioxide flows to the combustor casing 70.

The carbon dioxide guided between the combustor casing 70 and the cylinder body 80 flows through the annular space between the combustor casing 70 and the cylinder body 80 to the downstream side. At this time, the carbon dioxide cools the combustor casing 70, the cylinder body 80, and the pipe-shaped member 101 of the ignition device 100A. This carbon dioxide is used also for cooling stator blades 85 and rotor blades 86 of the turbine 25, for example. By such cooling, the temperature of the combustor casing 70 becomes about 400° C., for example.

Therefore, it is possible to maintain the temperature of the combustor casing 70 having the heat-resistant glass 102 of the ignition device 100A to about 400° C. even under the turbine rated load of the CO$_2$ gas turbine facility. That is, the temperature of the heat-resistant glass 102 of the ignition device 100A is maintained to about 400° C.

As above, according to the combustor 20 in the first embodiment, the temperature of the heat-resistant glass 102 of the ignition device 100A installed in the combustor 20 can be maintained to about 400° C. even in a state where the pressure inside the combustor 20 under the turbine rated load is high. This increases flexibility of selecting the material of the heat-resistant glass 102.

Here, the high-temperature and high-pressure conditions under the turbine rated load of the CO$_2$ gas turbine facility have greatly surpassed the pressure-resistant specifications and heat-resistant specifications of a conventional ignition device. However, in the first embodiment, it is possible to avoid the heat-resistant glass 102 of the ignition device 100A installed in the combustor 20 being exposed to the high-temperature condition under the turbine rated load of the CO$_2$ gas turbine facility.

Therefore, the structure of the combustor 20 in the first embodiment enables the ignition device 100A to work safely even under the turbine rated load of the CO$_2$ gas turbine facility and perform stable ignition.

Further, providing the cylinder body 80 and the pipe 42 coupled to the cylinder body 80 prevents the combustor casing 70 from being exposed to the high-temperature carbon dioxide. Further, letting the low-temperature carbon dioxide flow between the combustor casing 70 and the cylinder body 80 enables suppression of an increase in temperature of the combustor casing 70. Therefore, the combustor casing 70 is formed of an inexpensive Fe (iron)-based heat-resistant steel such as CrMoV steel or CrMo steel, for example.

Figure 4:
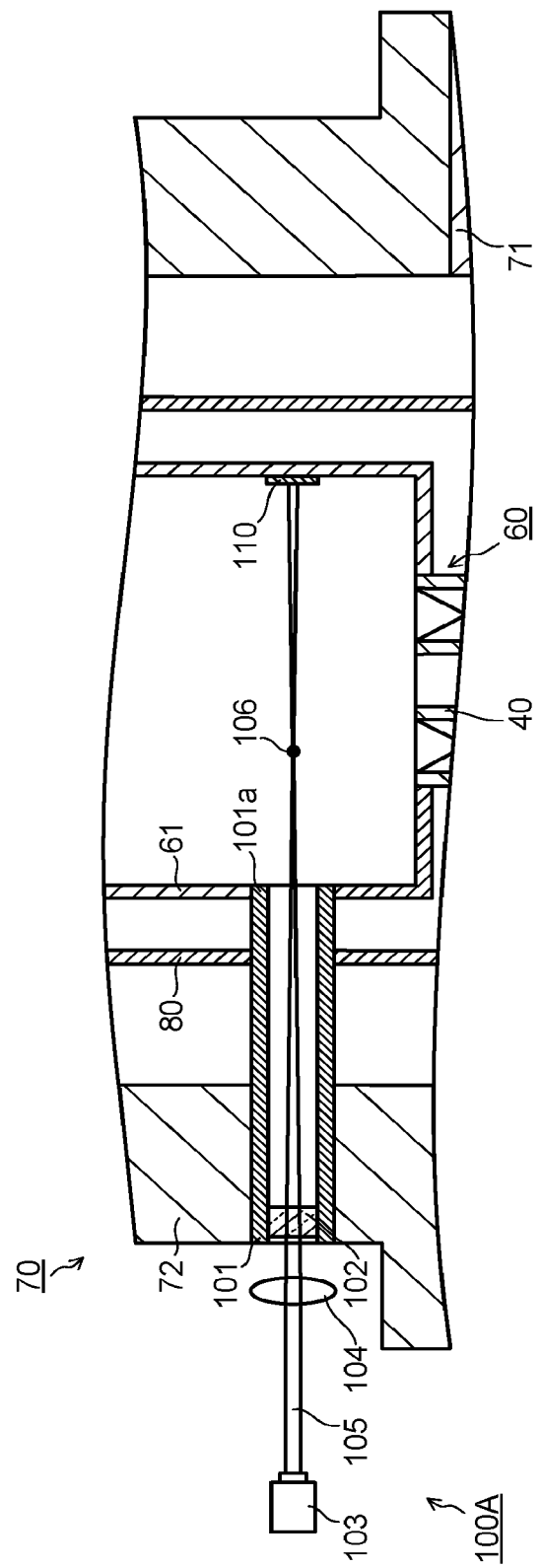
FIG. 4 is a view schematically illustrating a longitudinal section of a part of the combustor including another composition according to the first embodiment.

Here, the composition of the combustor 20 according to the first embodiment is not limited to the above-described composition. FIG. 4 is a view schematically illustrating a longitudinal section of a part of the combustor 20 having another composition according to the first embodiment.

As illustrated in FIG. 4, the laser light 105 that has passed through the focal point 106 travels while expanding a beam diameter. The thickness of an inner wall of the combustor liner 61, which is located in the traveling direction of this laser light and to which this laser light 105 is applied, may be increased more than the thickness of the inner wall of a different portion.

This thick portion 110 may be formed by increasing the thickness of the inner wall of the combustor liner 61. Further, the thick portion 110 may be formed by attaching a metal or ceramic plate-shaped member to an inner wall surface of the combustor liner 61. The plate-shaped member is curved in a manner to correspond to the shape of the inner wall surface of the combustor liner 61.

Providing this thick portion 110 makes it possible to prevent damage of the inner wall surface of the combustor liner 61 caused by the laser light 105.

Second Embodiment

Figure 5:
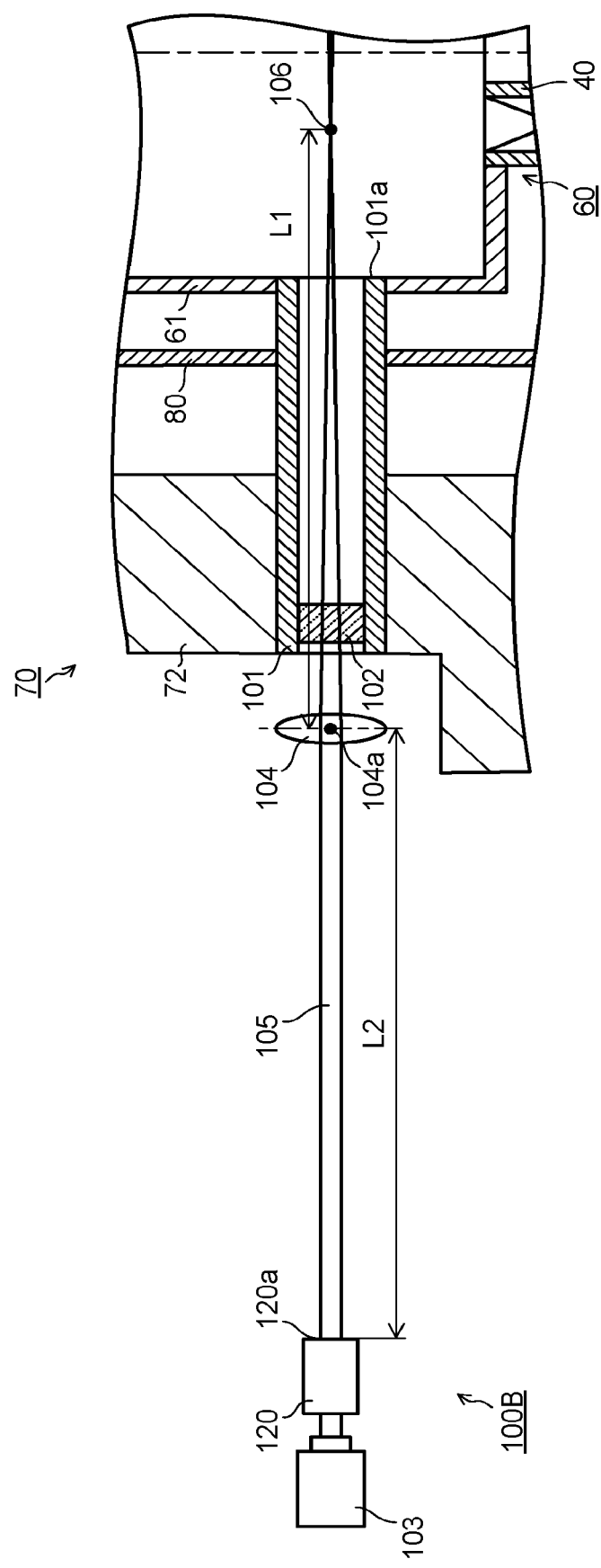
FIG. 5 is an enlarged view schematically illustrating a longitudinal section of an ignition device in a combustor according to a second embodiment.

FIG. 5 is an enlarged view schematically illustrating a longitudinal section of an ignition device 100B in a combustor 20 according to a second embodiment. The same reference numerals and symbols are added to the same components as those of the combustor 20 in the first embodiment, and their overlapping explanations are omitted or simplified.

The ignition device 100B in the second embodiment is formed in the same manner as the ignition device 100A in the first embodiment except that an optical isolator 120 is provided. Therefore, this different composition will be explained mainly here.

As illustrated in FIG. 5, the ignition device 100B includes the pipe-shaped member 101, the heat-resistant glass 102, the laser oscillator 103, the condensing lens 104, and the optical isolator 120.

The optical isolator 120 allows only the laser light 105 oscillated by the laser oscillator 103 and traveling in the traveling direction (forward direction) to transmit therethrough and blocks light (the laser light 105) traveling in the backward direction. This optical isolator 120 is provided between the laser oscillator 103 and the condensing lens 104.

The laser light 105 oscillated by the laser oscillator 103 and traveling in the traveling direction transmits through the optical isolator 120 to travel toward the condensing lens 104. The laser light 105 that has entered the condensing lens 104 passes through the inside of the pipe-shaped member 101 to be focused on the focal point 106 in a predetermined region inside the combustor casing 61.

At this time, when there is laser light traveling in the backward direction due to reflection on the heat-resistant glass 102, or the like, the laser light traveling in the backward direction is blocked by the optical isolator 120.

As above, providing the optical isolator 120 between the laser oscillator 103 and the condensing lens 104 prevents the laser light traveling in the backward direction due to reflection on, for example, the heat-resistant glass 102, or the like from returning to the laser oscillator 103. Therefore, it is possible to prevent damage of the laser oscillator 103 caused by the laser light traveling in the backward direction.

Here, as illustrated in FIG. 5, a distance L2 between an end portion 120a of the optical isolator 120 on the condensing lens 104 side and a center 104a of the condensing lens 104 is longer than a focal length L1 of the condensing lens 104. Making the length L2 longer than the focal length L1 prevents the laser light from being focused inside the optical isolator 120 even though the laser light traveling in the backward direction due to reflection on the heat-resistant glass 102, or the like passes through the condensing lens 104. This makes it possible to prevent damage of the optical isolator 120 caused by the laser light traveling in the backward direction.

In the second embodiment as well, similarly to the first embodiment, the temperature of the heat-resistant glass 102 of the ignition device 100B can be maintained to about 400° C. even under the turbine rated load of the $CO_2$ gas turbine facility. Therefore, it is possible to operate the ignition device 100B safely and perform stable ignition. Further, in the second embodiment as well, the thick portion 110 illustrated in FIG. 4 may be provided.

Third Embodiment

FIG. 6 is an enlarged view schematically illustrating a longitudinal section of an ignition device 100C of a combustor 20 according to a third embodiment. The same reference numerals and symbols are added to the same components as those of the combustor 20 in the first embodiment, and their overlapping explanations are omitted or simplified.

The ignition device 100C in the third embodiment is formed in the same manner as the ignition device 100A in the first embodiment except that a beam expander 130 is provided. Therefore, this different composition will be explained mainly here.

As illustrated in FIG. 6, the ignition device 100C includes the pipe-shaped member 101, the heat-resistant glass 102, the laser oscillator 103, the condensing lens 104, and the beam expander 130.

The beam expander 130 expands a beam diameter of the laser light 105. That is, the beam diameter of the laser light 105 that has passed through the beam expander 130 expands. Then, the laser light 105 enters the condensing lens 104 in a state of the beam diameter expanding.

The laser light 105 that has entered the condensing lens 104 passes though the inside of the pipe-shaped member 101 to be focused on the focal point 106 in a predetermined region inside the combustor liner 61. The laser light 105 travels in the traveling direction from the focal point 106 while expanding the beam diameter.

As above, after expansion of the beam diameter, light is condensed, and thereby a spot diameter becomes small, resulting in that it is possible to obtain a high energy density. This enables secure ignition of the mixture.

Further, the beam expander 130 expands the beam diameter, and thereby the beam diameter of the laser light 105 that has passed through the focal point 106 expands as compared to the case with no expansion of the beam diameter by the beam expander 130. Therefore, in the case where the beam expander 130 is provided, an area formed by applying the laser light 105 passed through the focal point 106 to the inner wall surface of the combustor liner 61 is increased as compared to the case where the beam expander 130 is not provided.

That is, in the case where the beam expander 130 is provided, the energy density of the laser light 105 on the inner wall surface of the combustor liner 61 is smaller compared to the case where the beam expander 130 is not provided. Therefore, providing the beam expander 130 makes it possible to suppress damage of the inner wall surface of the combustor liner 61 caused by the laser light 105.

In the third embodiment as well, similarly to the first embodiment, the temperature of the heat-resistant glass 102 of the ignition device 100C can be maintained to about 400° C. even under the turbine rated load of the $CO_2$ gas turbine facility. Therefore, it is possible to operate the ignition device 100C safely and perform stable ignition. Further, in the third embodiment as well, the thick portion 110 illustrated in FIG. 4 may be provided.

According to the above-explained embodiments, it becomes possible to provide the gas turbine combustor including the ignition device capable of being used under a high temperature and pressure environment where a supercritical pressure working fluid is introduced.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A gas turbine combustor, comprising:
a casing;
a flame tube provided in the casing to combust a fuel and an oxidizer;
a cylinder body demarcating a space between the casing and the flame tube;
a first combustion gas supply pipe that guides a first combustion gas between the flame tube and the cylinder body, the first combustion gas exhausted from the flame tube and having driven a turbine;
a second combustion gas supply pipe that guides a second combustion gas having a temperature lower than the first combustion gas to be guided to the first combustion gas supply pipe between the casing and the cylinder body, the second combustion gas exhausted from the flame tube and having driven the turbine;
a pipe-shaped member provided so as to penetrate the casing, the cylinder body, and the flame tube;
a heat-resistant glass provided, inside the pipe-shaped member, to be on an outer side relative to a flow path between the casing and the cylinder body, the second combustion gas flowing through the flow path, the heat-resistant glass sealing the pipe-shaped member;
a condensing lens provided outside the casing in a manner to face the heat-resistant glass; and a laser oscillator that emits laser light to the inside of the flame tube through the condensing lens, the heat-resistant glass, and the inside of the pipe-shaped member.

2. The gas turbine combustor according to claim 1, wherein a thickness of an inner wall of the flame tube, which is located in a traveling direction of the laser light and to which the laser light is applied, is thicker than a thickness of the inner wall of a different portion.

3. The gas turbine combustor according to claim 1, further comprising:

an optical isolator provided between the laser oscillator and the condensing lens.

4. The gas turbine combustor according to claim 2, further comprising:

an optical isolator provided between the laser oscillator and the condensing lens.

5. The gas turbine combustor according to claim 3, wherein a length between an end portion of the optical isolator on the condensing lens side and the center of the condensing lens is longer than a focal length of the condensing lens.

6. The gas turbine combustor according to claim 4, wherein a length between an end portion of the optical isolator on the condensing lens side and the center of the condensing lens is longer than a focal length of the condensing lens.

7. The gas turbine combustor according to claim 1, further comprising:

a beam expander provided between the laser oscillator and the condensing lens.

8. The gas turbine combustor according to claim 2, further comprising:

a beam expander provided between the laser oscillator and the condensing lens.

* * * * *